United States Patent
Klöpfer et al.

(10) Patent No.: US 6,719,117 B2
(45) Date of Patent: Apr. 13, 2004

(54) SELF-ADJUSTING CLUTCH RELEASE BEARING

(75) Inventors: Bernhard Klöpfer, Bad Windsheim (DE); Steffen Dittmer, Herzogenaurach (DE); Ludwig Winkelmann, Erlangen (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 10/103,909

(22) Filed: Mar. 22, 2002

(65) Prior Publication Data

US 2002/0134641 A1 Sep. 26, 2002

(30) Foreign Application Priority Data

Mar. 24, 2001 (DE) .......................... 101 14 846

(51) Int. Cl.$^7$ ................................ F16D 23/14
(52) U.S. Cl. ..................... 192/98; 192/110 B
(58) Field of Search .................. 192/98, 110 B (56) References Cited

U.S. PATENT DOCUMENTS

| | | | |
|---|---|---|---|
| 1,431,551 A | * 10/1922 | White | ............. 192/110 B |
| 3,741,361 A | 6/1973 | Brandenstein | |
| 3,948,371 A | * 4/1976 | Lonne | ............. 192/98 |
| 3,951,244 A | * 4/1976 | Neder | ............. 192/98 |
| 4,305,492 A | * 12/1981 | Mori et al. | ............. 192/98 |
| 4,565,272 A | 1/1986 | Miyahara | |
| 4,739,867 A | * 4/1988 | Harrington | ............. 192/98 |
| 6,056,446 A | * 5/2000 | Welter et al. | ............. 384/607 |

FOREIGN PATENT DOCUMENTS

| | | |
|---|---|---|
| DE | 72 45 141 U | 3/1973 |
| DE | 199 12 432 A1 | 9/1999 |
| DE | 199 49 909 A1 | 4/2001 |
| GB | 4 74 112 A | 10/1937 |

* cited by examiner

*Primary Examiner*—Saul Rodriquez
(74) *Attorney, Agent, or Firm*—Henry M. Feiereisen (57) ABSTRACT

A release bearing includes a rolling-contact bearing having a non-rotatable outer ring, a rotating inner ring, and plural rolling members located between the outer and inner rings. The inner ring is intended to interact with an adjustment ring which has a ring flange for abutment against a disk spring of a clutch mechanism. Disposed in a support zone between the inner ring and the adjustment ring is a sliding element whereby the support zone is configured in the form of complementary calotte-shaped portions so that the adjustment ring and the inner ring are movable relative to one another for effecting a self-adjustment of the release bearing.

21 Claims, 9 Drawing Sheets

SELF-ADJUSTING CLUTCH RELEASE BEARING

CROSS-REFERENCES TO RELATED APPLICATIONS

This application claims the priority of German Patent Application Serial No. 101 14 846.1, filed Mar. 24, 2001.

BACKGROUND OF THE INVENTION

The present invention relates, in general, to a clutch release bearing, and more particularly to a clutch release bearing for use in a clutch mechanism for motor vehicles.

A clutch release bearing is typically intended for actuation of a clutch mechanism, e.g. separating clutch, disposed between the internal combustion engine and a gearbox, and is configured as a tapered roller bearing which includes a non-rotatable outer bearing ring, a revolving inner bearing ring, and rolling members, received in a cage and guided between the bearing rings. Operatively connected to the inner ring is an adjustment ring, which establishes a connection between a disk spring of the clutch mechanism and the release bearing. The adjustment ring is configured to allow a relative movement of the adjustment ring and the inner ring so as to implement a self-adjusting or self-aligning release bearing.

Such a release bearing is able to compensate shocks generated by axial misalignment with the disk spring that is connected directly to the clutch mechanism. The axial misalignment, caused by the disk spring, increases wear and thus reduces the service life of the release bearing and triggers the so-called clutch judder that adversely affects the overall riding comfort.

German Pat. No. DE 72 45 141 U describes a release bearing which includes an adjustment ring disposed between the disk spring or arms of the disk spring of the clutch mechanism and the inner ring of the release bearing. The contact zone between the adjustment ring and the inner ring is hereby configured with complementing spherical surfaces of the adjustment ring and the inner ring so as to allow a relative movement and alignment between these structural parts. The inner ring and the adjustment ring are designed as massive parts which are made through a material-removing process and expensive and require a fairly large space for installation.

German Pat. No. 199 12 432 A1 describes a self-aligning release bearing with a revolving inner ring. Provided between the disk spring or arms of the disk spring of the clutch mechanism and the inner ring is an adjustment ring, which together with the inner ring is supported by complementary calotte-shaped segments. The bearing rings of the release bearing as well as the adjustment ring are made through a deep-drawing process without material removal.

Common to both, German Pat. No. DE 72 45 141 U and German Pat. No. 199 12 432 A1, is the fact that the adjustment ring and the inner ring are made of same material. As a consequence, rust formation caused by friction can be experienced, resulting in greater wear, so that the service life of these release bearings is insufficient to meet the demands by vehicle manufactures.

It would therefore be desirable and advantageous to provide an improved release bearing, which obviates prior art shortcomings and which exhibits a long service life, is maintenance-free and cost-efficient to produce while still being reliable in operation to effectively dampen or compensate axial misalignments, to prevent clutch judder.

SUMMARY OF THE INVENTION

According to one aspect of the present invention, a release bearing includes a rolling-contact bearing having a non-rotatable outer ring, a rotating inner ring, and plural rolling members located between the outer and inner rings; an adjustment ring having a ring flange for abutment against a disk spring of a clutch mechanism; and a sliding element made of bearing material and disposed in a support zone defined between the inner ring and the adjustment ring and configured in the form of complementary calotte-shaped portions so that the adjustment ring and the inner ring are movable relative to one another for effecting a self-adjustment of the release bearing.

The present invention resolves prior art problems by providing a sliding element in the contact zone between the adjustment ring and the revolving inner ring of the release bearing. As a result of the reduction in friction, the self-adjusting feature of the components, inner ring and adjustment ring, is significantly improved. The optimized self-adjustment is further able to significantly dampen the axial shocks generated by the disk spring or arms of the disk spring as a result of axial oscillations of the internal combustion engine and transmitted via the clutch mechanism into the release bearing.

According to another feature of the present invention, the sliding element may be made of a bearing material or a suitable friction-reducing and wear-resistant material to ensure a maintenance-free and long service life. Thus, a direct support of the inner ring and the adjustment ring, which are both made of steel, is prevented. By sandwiching the sliding element in the support zone between the inner ring and adjustment ring, the latter components are effectively decoupled from one another so that noise development is suppressed and friction-based rust formation as well as clutch judder is prevented. The sliding element can be connected to either one of the carriers, i.e. inner ring or adjustment ring, without requiring any modification of the carrier that is selected to bear against the sliding element, so that existing installation space can be used.

It is to be understood by persons skilled in the art that the term "carrier" is used in the following description to refer to the inner ring of the release bearing or to the adjustment ring.

The wear of the spherical contact zones of the sliding elements by the inner ring and the adjustment ring is comparably small. The sliding element can be produced in great numbers cost-efficiently and requires no particular handling for installation and attachment to the inner ring of the release bearing or the adjustment ring. The securement of the sliding element can be implemented in any suitable manner known to the artisan and includes force-fitting and/or positive connections. During operation, the sliding element separates the inner ring of the release bearing from the adjustment ring and allows a maintenance-free self-adjustment between the inner ring and the adjustment ring. The self-adjustment, which is realized at low friction and exhibits damping characteristics at the same time, is implemented with little wear and may be effected together with a self-alignment in radial direction.

According to one embodiment of the present invention, the sliding element may be connected to the adjustment ring. A largest possible contact surface can be realized, when the sliding element embraces the entire side of the adjustment ring, directed to the inner ring of the release bearing. In this way, a direct contact between the inner ring and the adjustment ring is prevented, even at extremely tilted positions. The support of the sliding element over a large area improves further the securement of the sliding element to the adjustment ring. As an alternative, the sliding element may also be connected over a large area to the inner ring of the release bearing at the side facing the adjustment ring. In either case, the large-area contact of the sliding element upon the adjustment ring or inner ring results in a sufficient support in each and every position, i.e., also when the adjustment ring occupies an extremely tilted disposition. At the same time, the large-area contact of the sliding element ensures a reduced surface pressure so that the strength and rigidity of the sliding element is not adversely affected.

According to another feature of the present invention, the sliding element may also be configured in segments to thereby improve the adhesion of the sliding element because tension as a consequence of different coefficients of thermal expansion between the carrier, i.e. adjustment ring or inner ring, and the sliding element is effectively eliminated. Of course, the sliding element may also be configured with at least one longitude slot, which coincides with the symmetry axis, in order to compensate varying coefficients of thermal expansion. Instead of one slot, also several slots may be provided about the circumference of the sliding element, whereby the slots may be formed alternately on the inside or outside of the sliding element. Any suitable configuration of the slot or slots is conceivable, i.e., straight, meander-shaped or slanted.

The production costs for making a sliding element according to the present invention can be reduced, when employing an injection molding process. This process can also be used to incorporate in a single step the slots and grooves in the sliding element for compensation of varying coefficients of thermal expansion. The injection molding process may have sprue gates or a cone gate so that the sliding element can be made with a same strength essentially throughout.

Regardless of its configuration, the sliding element may be positively secured to either one of the carriers, i.e. inner ring of the release bearing or the adjustment ring. Suitably, the surface of the carrier may be formed with grooves for engagement of projections of the sliding element. As a result, the sliding element is also secured against rotation. As an alternative, the sliding element may be urged into a forced engagement to the carrier, for example, through gluing. An example of a suitable glue includes a high-temperature adhesive. Gluing of the sliding element ensures also a compensation of even small unevenness between the carrier and the sliding element so as to prevent the formation of voids which are detrimental to a secure attachment of the sliding element.

According to another feature of the present invention, the sliding element may be formed by a coating applied directly through injection onto the inner ring or adjustment ring. In this way, diametrical tolerances of the mating components, inner ring and adjustment ring, that may influence the structural length, are eliminated. Suitably, the carrier may include in the contact zone with the sliding element a circumferential crease or groove, which is filled by the material of the sliding element during injection molding, to realize an effective securement of the sliding element to the carrier. In this way, the need for an additional separate securement of the sliding element is eliminated. Stress through shrinkage during injection molding can be counteracted in a controlled manner, by providing the inner ring or the adjustment ring in the support zone with at least one axis-parallel or helical notch. To prevent a rotation of the parts, a groove is provided in diametric opposition to the notch and also filled with sliding element material during injection molding.

The sliding element, on the one hand, and the inner ring or the adjustment ring, on the other hand, may be made of different materials. The material for the sliding element is selected by taking into account optimum wear properties and friction properties as well as inexpensive fabrication and mounting to the inner ring or adjustment ring. The carrier, inner ring or adjustment ring, forms a unitary structure with the sliding element and is suitably made of steel. The configuration of the carrier allows hereby a production without material removal, in particular a deep-drawing process that enables a production of the adjustment ring as well as of the inner ring on a large scale in a cost-efficient manner. A sufficient strength, especially wear-resistance, can be realized, at least in those zones that are subject to high loads, such as the calotte-shaped segments, tracks for the rolling members, or contact surface for support of the arms of the disk spring of the clutch mechanism, through respective heat-treatment.

The sliding element is suitably made of a high-strength and wear-resistant plastic, such as thermoplastic material or a duroplastic material. The sliding element may include additives such as carbon fibers, $MoS_2$, PTFE and/or epoxy resins, alone or in combination, for realizing a lubrication and/or improved service life, when the sliding element is based on duroplastic material. The use of duroplastic material significantly enhances the useful life of the sliding element, without adversely affecting the manufacturing costs. The sliding element may also be made of PPA or PA46 combined with carbon fibers as wear-reducing agent and PTFE as friction-reducing agent. Its may also be conceivable to make the sliding element of ceramic material. This ceramic material, also called industrial ceramic, exhibits optimal wear-resistance and is therefore suitable for use with a contact surface that is subject to severe conditions and soiling during operation of the release bearing.

The adjustment ring may be made by a deep-drawing process and is suitably made of steel C80M which subsequently can be hardened through heat-treatment.

Persons skilled in the art will understand, that the foregoing description of materials for the sliding elements is not exhaustive but only illustrative, because other materials or material combinations may be conceivable as well so long as they generally follow the concepts outlined here, i.e. exhibit sufficient friction properties and wear-resistance and can be shaped appropriately and manufactured in a cost-efficient manner.

According to another feature of the present invention, the relative movement between the adjustment ring and the inner ring of the release bearing may be limited by providing the sliding element with a collar to form a stop between the components to be moved. Suitably, the collar is formed in one piece onto the sliding element and extends in parallel relationship to a ring flange of the adjustment ring, when installed. In an extreme position, the collar also prevents the adjustment ring from a support upon the outer contour of the inner ring.

As an alternative to the single-piece configuration of the adjustment ring with radially directed ring flange, for support of the disk spring of the clutch mechanism, and calotte-shaped segment to complement the inner ring, the disclosure also covers an assembled adjustment ring. Such an adjustment ring includes a radial ring flange, preferably made of steel, for direct attachment of the sliding element, made for example of plastic. Suitably, the sliding element is made from a duroplastic material by an injection tool drawn in axial direction to provide a N-section profile. The use of duroplastic material is advantageous here because of its sufficient strength and shape stability. The sliding element may be secured to the ring flange through gluing in combination with protrusions for positive engagement in respective recesses of the ring flange. A two-part design allows an optimal material selection that can be best suited to the function of the ring flange and the sliding element and combined to a unitary structure.

The assembled adjustment ring may also be made of components of same material. For example, the adjustment ring may be made of ceramic material or duroplastic material. The single parts of the adjustment ring can be glued in the bore area of the flange and thus permanently connected together. Examples of positive connections between these two parts include a crown gearing and/or spline profiles or the like, whereby a greater contact surface is realized at the same time. In addition, the adjustment ring is secured against rotation and the bonding of the parts is improved. Excess adhesive can be accumulated in depressions or notches formed on at least one bonded surface of the annular regions being joined. As the adjustment ring is composed of parts of same material, the coefficient of thermal expansion is of no concern here. At the same time, the two-part configuration decreases manufacturing costs. The approximately axially aligned region of the adjustment ring, provided for reinforcement for the sliding element, is omitted and results to on optimization of the component.

The adjustment ring may also have a single-piece configuration and be made of duroplastic material or ceramic, to further optimize the component.

According to another feature of the present invention, all components of the release bearing are captivated after mounting and installation, by so configuring an end portion of the sliding element or a leg portion of the adjustment ring as to engage in an annular groove or recess in the elastic housing with play so as to radially overlap an outer contour of a housing wall of the annular groove. Thus, the housing can be joined together and captivated with the release bearing and the adjustment to form a prefabricated unitary structure.

According to another feature of the present invention, a seal is received in the form of a labyrinth seal between the sliding element, the housing and the inner ring of the release bearing. The sliding element has one end which points to the guide sleeve and has a projection which forms with a wall portion of the annular groove and/or a seal for the guide sleeve a labyrinth-like gap, for realizing an improved sealing of the release bearing.

According to another feature of the present invention, the calotte-shaped portions of the inner ring and the sliding element are disposed at an angle of $\geq 20°$ to an axis of symmetry of the release bearing. Suitably, the sliding element and the inner ring have a radius of $\geq 25$ mm in the area of the contact surface.

According to another feature of the present invention, the release bearing is self-adjusting, wherein the outer ring has an annular skirt which is guided on a retention element, mounted non-rotatably on the housing, for displacement in an axial direction. A radial displacement between the release bearing and the housing is thus precluded.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals.

Figure 1:
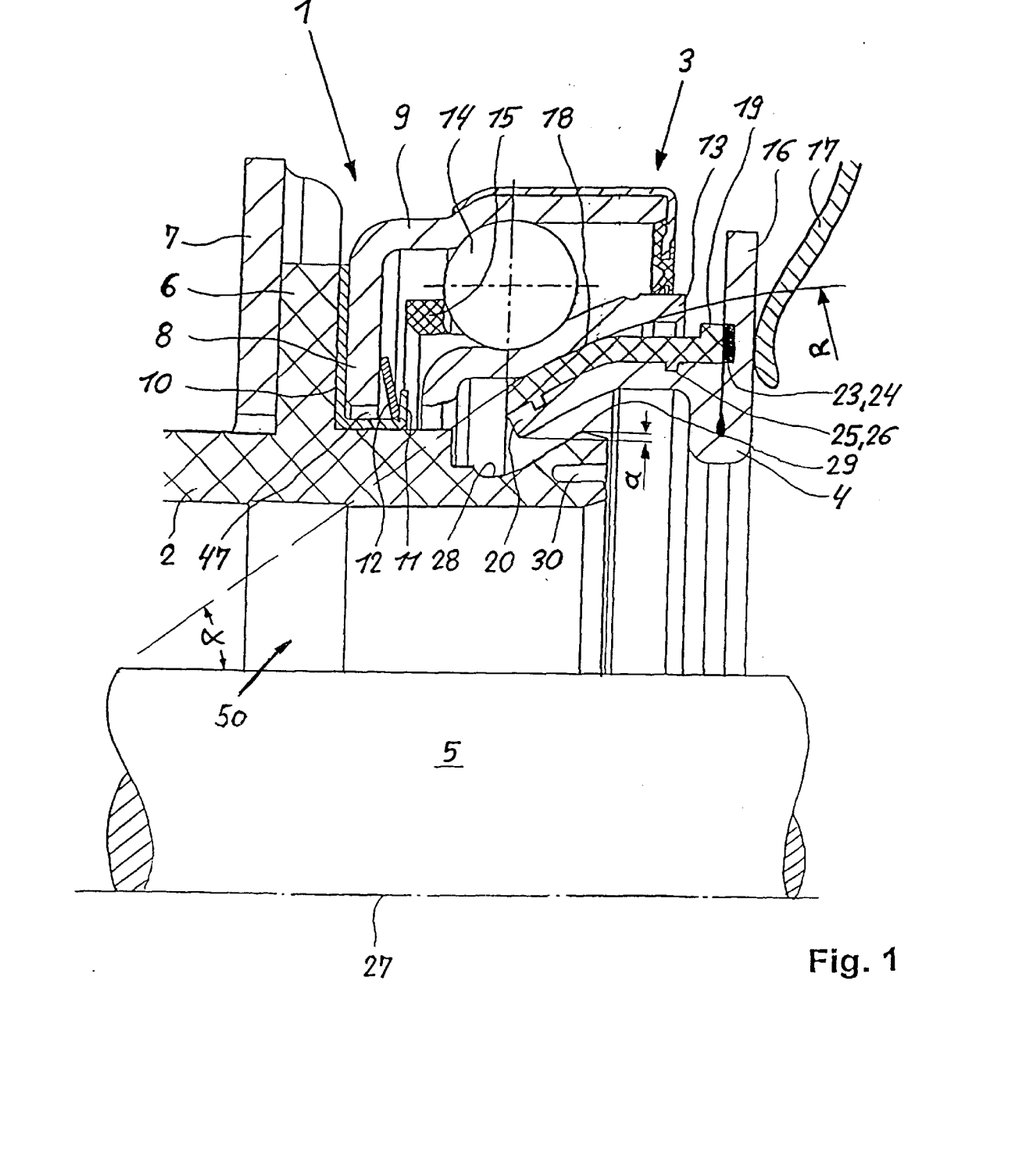
FIG. 1 is a half-section of a novel and inventive release apparatus having incorporated therein a release bearing according to the present invention for interaction with an adjustment ring, with a sliding element connected to the adjustment ring.

Turning now to the drawing, and in particular to FIG. 1, there is shown a half-section of a release apparatus, generally designated by reference numeral 1 and defined by a symmetry axis 27. The release apparatus 1 includes a casing 2 which is guided on a guide sleeve 50 positioned in concentric surrounding relationship to a driveshaft 5 which connects an internal combustion engine to a gearbox. The casing 2 is formed with a radial shoulder 6 which is directed outwards and has one side intended for engagement of an actuating member 7 in the form of, e.g., a fork or rocker, whereby the actuating member 7 is connected to the clutch pedal in the footwell inside a motor vehicle via a cable or actuator. The other side of the shoulder 6 is intended for support of a release bearing, generally designated by reference numeral 3. The release bearing 3 is configured in the form of a tapered roller bearing and includes a non-rotatable outer ring 9 which is formed with an annular bottom or skirt 8 turned radially inwards and resting against the shoulder 6. Interposed between the skirt 8 and the shoulder 6 of the casing 2 is a sheet-metal holder or clip 10 which covers an end face of the skirt 8 and urges the skirt 8 in forced engagement against the shoulder 6 by means of a disk spring 12. The clip 10 has an axial portion which extends across a width of the skirt 8 and terminates in an inwardly turned shoulder 11. The disk spring 12 is positioned between the shoulder 11 and the skirt 6 and applies a force to hold the skirt 6 in abutment against the shoulder 3 of the outer ring 9 via the clip 10. A radial annular gap 47 is defined between the clip 10 and the skirt 8 to allow a self-adjustment of the release bearing 3 with respect to the housing 2.

The release bearing 3 further includes a revolving inner ring 13, which is made of steel. A plurality of rolling members 14 is guided between confronting raceways of the outer ring 9 and the inner ring 13 and held by a cage 15. Disposed at the side of the inner ring 13, distal to the rolling members 14, the release apparatus 1 has an adjustment ring 4, made of steel, for support of the inner ring 13. The adjustment ring 4 has a ring flange 16 which connects into a leg portion 20 in confronting relationship to the inner ring 13. Forced against the inner ring distal side of the ring flange 16 is one end of a spring member 17, e.g., a disk spring, or arms thereof, which is connected to a clutch mechanism, such as a separating clutch, not shown in FIG. 1.

In accordance with the present invention, the release apparatus 1 includes a sliding element 19 which is positioned between the inner steel ring 13 and the adjustment steel ring 16, to prevent a direct contact between the inner ring 13 and the adjustment ring 16 in a support zone 18. In order to enable a self-adjustment of the release bearing 3 with respect to the adjustment ring 4, the directly supported components, the inner ring 13 and the leg portion 20 of the adjustment ring 4, have complementary calotte-shaped configuration in the support zone 18. In the exemplified embodiment of FIG. 1, the sliding element 19 is secured to the adjustment ring 4 and extends from the ring flange 16 across the entire length of the leg portion 20 to also form hereby a calotte-shaped configuration, i.e. a convex section, which is urged in forced engagement with the confronting concave surface of the inner ring 13.

The sliding element 19 may be made of a bearing material or a sliding bearing material and is suitably secured to the adjustment ring 4 in force-locking manner by gluing. In order to prevent a rotation thereof, the sliding element 19 is formed with plural, circumferentially spaced axial lobes 23 which positively engage complementary recesses 24 of the ring flange 16. As an alternative, or in addition, the sliding element 19 may also be provided with pins 25 for receiving in corresponding anchoring grooves 26 of the leg portion 20 of the adjustment ring 4.

As indicated in FIG. 1, the support zone 18 extends with respect to the symmetry axis 27 of the release apparatus 1 at an angle α of $\geq 20°$. Reference character R denotes the radius of the support zone 18, i.e., the sliding element 19 and the inner ring 13 have a radius of $\geq 25$ mm in the area of the support zone 18.

In order to provide a pre-fabricated structure in which all components of the release apparatus 1 are captivated, in particular the parts of the release bearing 2, the leg portion 20 of the adjustment ring 4 is so sized as to project into an annular groove 28 bounded by a housing wall portion 29 of the housing 2. In installed state, a radial overlap, designated by reference character "a", is established between an outer contour of the housing wall portion 29 and an inner contour of the leg portion 20. Suitably, the housing wall portion 29 is formed with a notch 30 which extends inwardly from the respective end face and allows the outer region of the housing wall portion 29 to shift elastically inwards as the adjustment ring 4 is installed.

Turning now to FIGS. 2 to 9, there are shown releases apparatuses of substantially similar configuration as the release apparatus of FIG. 1 so that parts corresponding with those in FIG. 1 are denoted by identical reference numerals and not explained again. In describing the following Figures, like parts of the release apparatus 1, in particular the sliding element 19, will be identified by corresponding reference numerals followed by a distinguishing lower case character.

Figure 2:
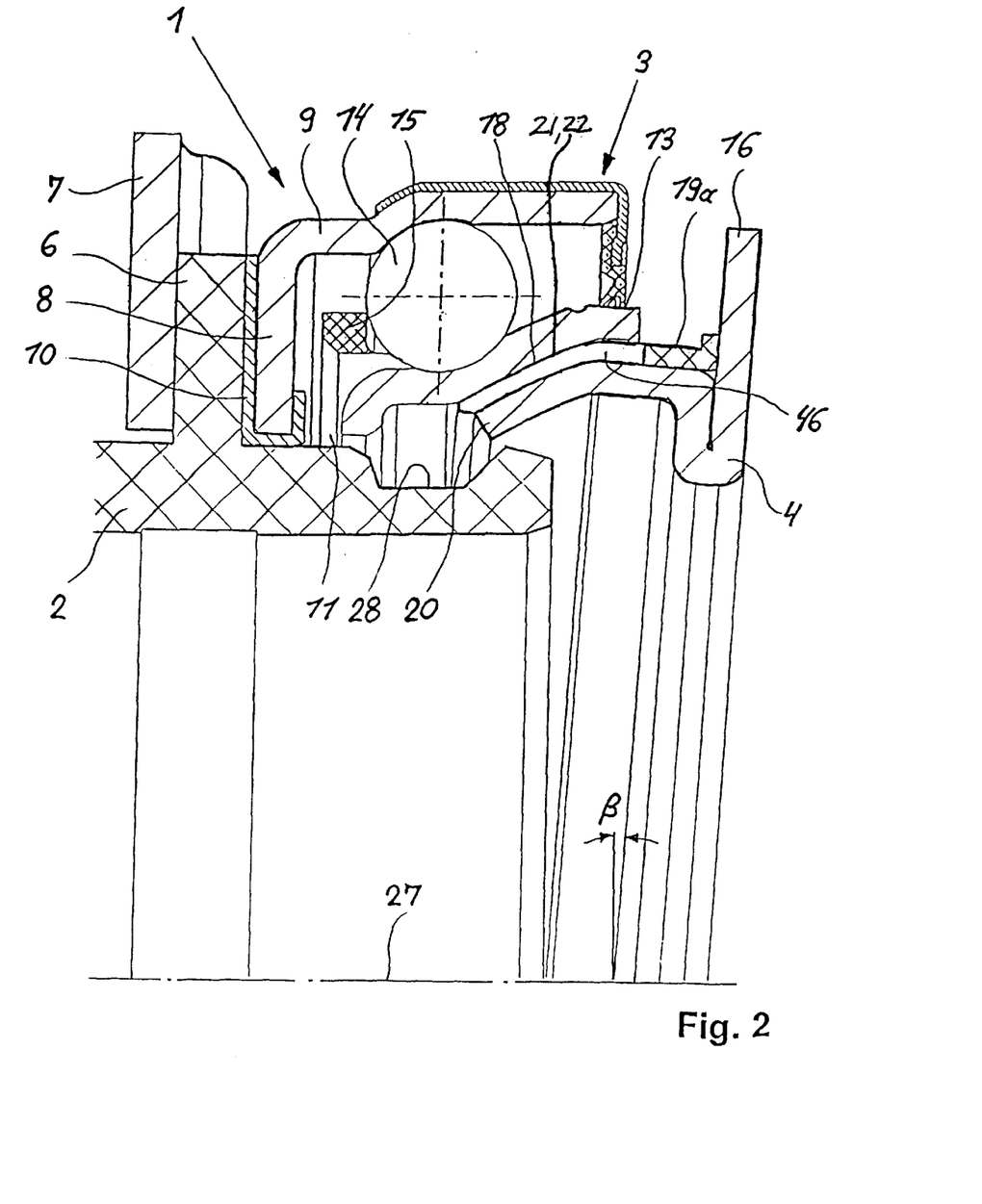
FIG. 2 is a half-section of the release bearing, showing the adjustment ring in an extreme tilt position with respect to the release bearing.

FIG. 2 is a half-section of the release apparatus 1, whereby the adjustment ring 4 is tilted to an extreme position relative to the release bearing 3 at an angle β. In order to reduce the surface pressure, the leg portion 20 of the adjustment ring 4 in concert with the sliding element 19a is extended inwardly downwards sufficient to establish a greatest possible support zone 18 between the inner ring 13 of the release bearing 3 and the sliding element 19. As a result, even when the adjustment ring 4 assumes the extreme tilt position, as shown, a large-area and sufficient support is realized to provide a high strength between the structural parts. The sliding element 19a is provided on the side facing the leg portion 20 with recesses or slots 46, which may be formed on one side or also on both sides of the sliding element 19a and compensate tension as a consequence of varying coefficients of thermal expansion between the material of the sliding element 19a and the material of the adjustment ring 4 and its leg portion 20.

Unlike in the release apparatus 1 in FIG. 1, the skirt 8 is guided here directly in radial direction by the clip 10 so as to omit the spring member 12.

Figure 3:
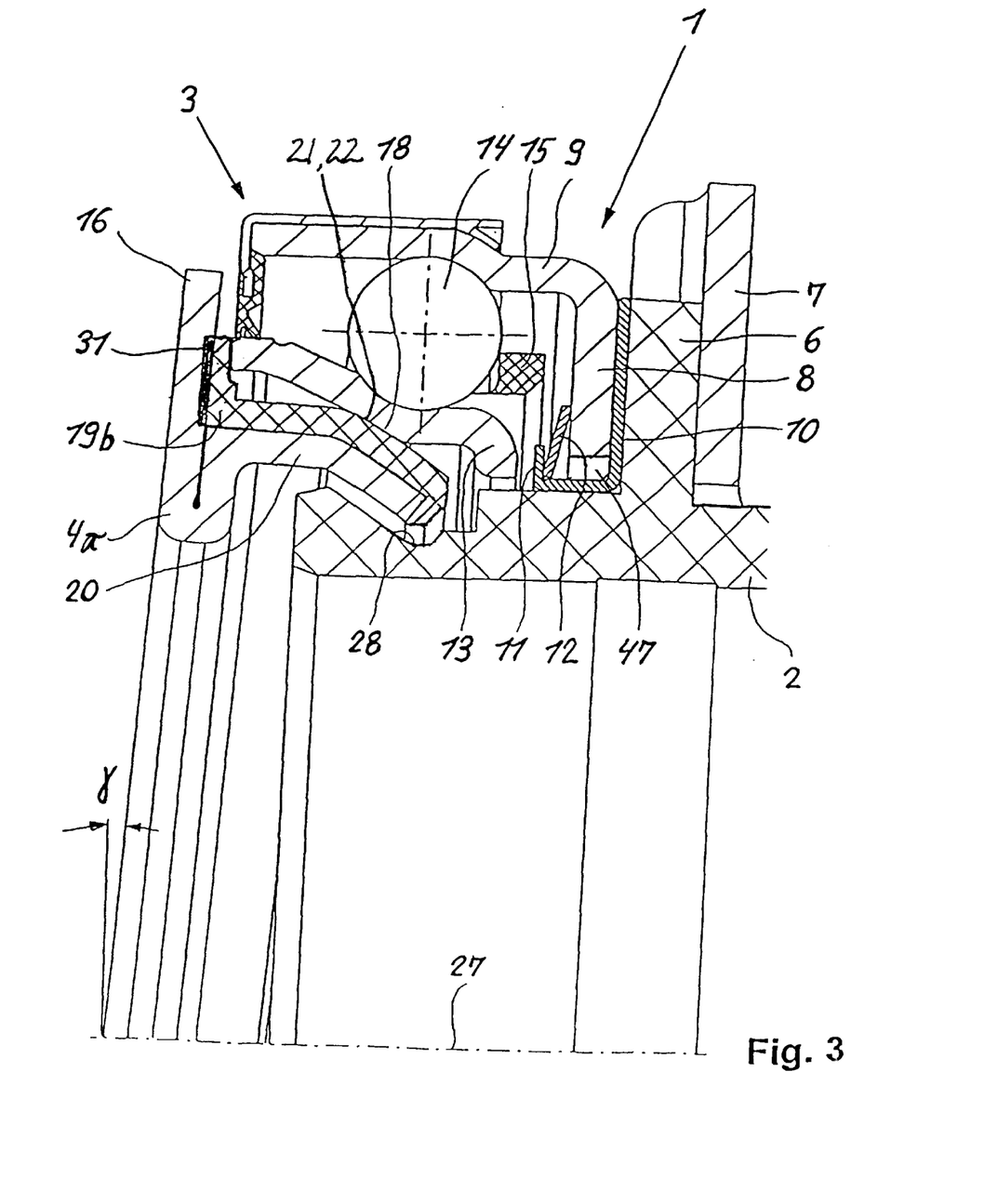
FIG. 3 is a half-section of the release bearing, having incorporated a variation of the sliding element and showing the adjustment ring in another extreme tilt position with respect to the release bearing.

FIG. 3 is a half-section of the release bearing 1 in which the adjustment ring 4 is tilted into the opposite extreme position. The ring flange 16 of the adjustment ring 4 is hereby tilted toward the release bearing 3 at an angle γ. To prevent a direct support of the ring flange 16 against the inner ring 13 of the release bearing 3, the sliding element 19b is provided with a prolongation 31 to extend radially between confronting surfaces of the ring flange 16 and the inner ring 13.

Figure 4:
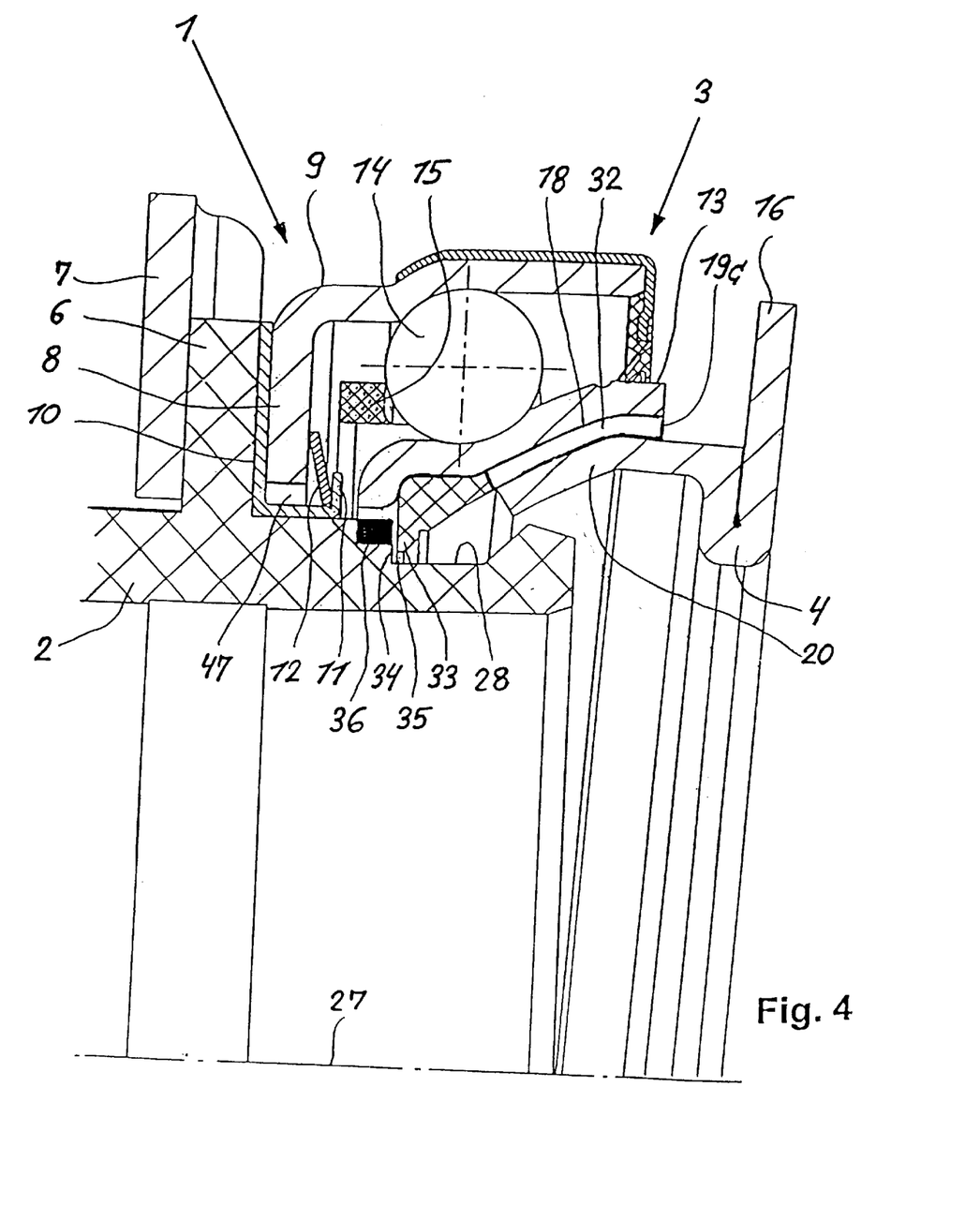
FIG. 4 is a half-section of another embodiment of a release bearing according to the present invention, with a sliding element connected to the inner ring of the release bearing.

FIG. 4 is a half-section of another embodiment of the release bearing 1 in which the sliding element 19c is connected to the inner ring 13 of the release bearing 1, whereby the sliding element 19c extends over the entire length of the inner ring 3 on the side thereof facing the adjustment ring 4. The sliding element 19c is secured to the inner ring 13 through gluing and includes at least one slot 32 which may have a straight or meander-like configuration. The slot 32 compensates the impact of varying coefficients of thermal expansion between the inner ring 13 and the sliding element 19c in view of their different material compositions. Although not shown in FIG. 4, the sliding element 19c may be provided with a plurality of such slots 32 spaced symmetrically about the circumference of the sliding element 19c and extending through the entire wall thickness of the sliding element 19c or one the side confronting the inner ring 13. At the end pointing to the housing 2, the sliding element 19c is formed with a radial projection 33 engaging the annular groove 28 of the casing 2. When installed, the projection 33 is aligned with clearance to a confronting housing wall portion 34, which bounds the annular groove 28, to form thereby a labyrinth 35. Placed on the outside of the housing wall portion 34 is a seal 36, which slides or placed to maintain an annular gap, to thereby ensure an effective sealing action between the inner ring 13 and the housing 2 in combination with the labyrinth 35.

Figure 5:
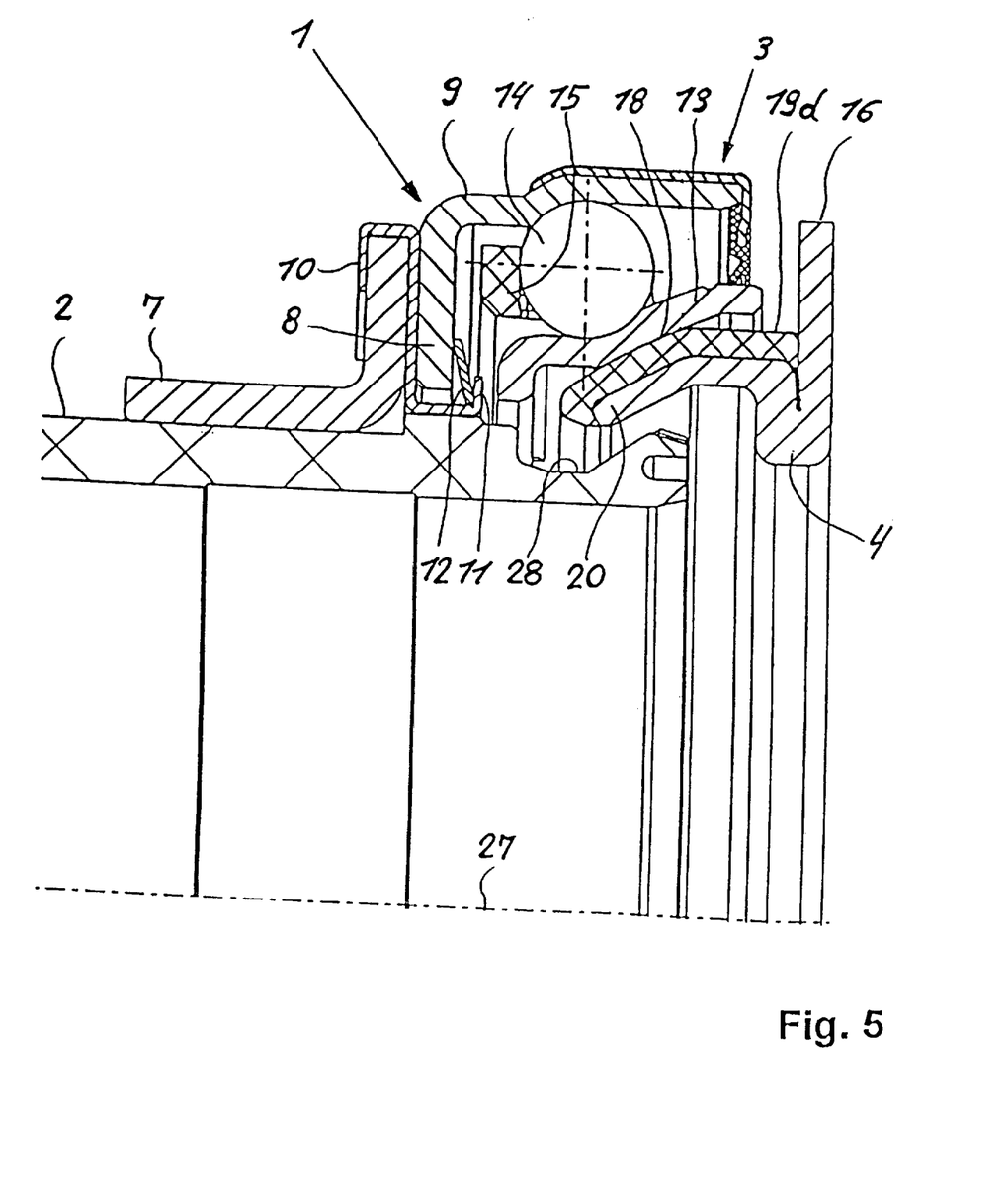
FIG. 5 is a half-section of the release apparatus, showing a modified combination of the adjustment ring and the sliding element.

FIG. 5 is a half-section of the release apparatus 1, showing a modified combination of the adjustment ring 4 and the sliding element 19d. In this embodiment, the adjustment ring 4 is made through a deep-drawing process without material removal, whereby the sliding element 19d is made of plastic through an injection molding process and applied on the leg portion 20 of the adjustment ring 4. Securement of the sliding element 19d onto the leg portion 20 of the adjustment ring 4 may be made through stamping. In addition, the sliding element 19d may be formed with pins, ribs or lobes for engagement in complementary recesses of the leg portion 20 of the adjustment ring 4 in order to prevent a rotation of the sliding element 19*d*.

Figure 6:
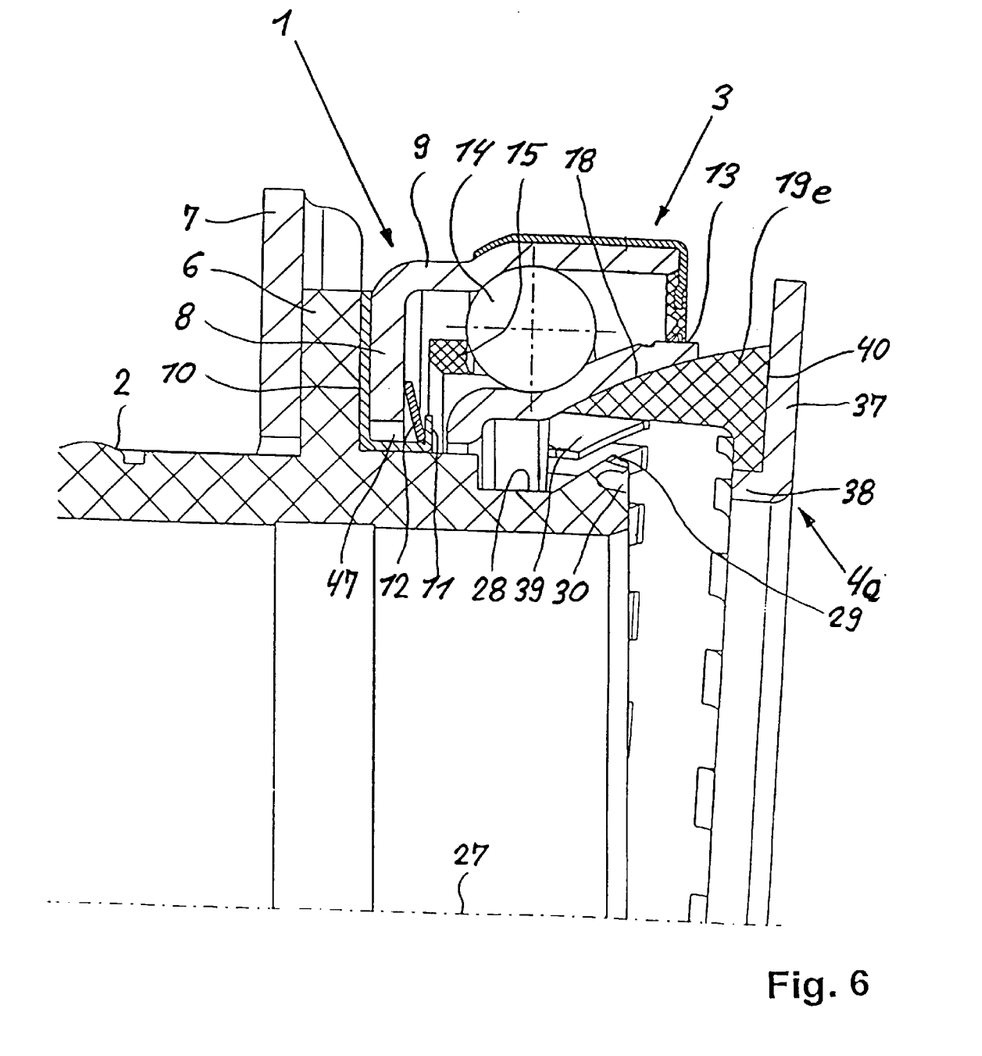
FIG. 6 is a half-section of the release apparatus, showing still another modified combination of the adjustment ring and the sliding element.

FIG. 6 is a half-section of the release apparatus 1, in which the adjustment ring 4*a* includes a flange 37, which is made of steel and has a support surface 40 for direct attachment of the sliding element 19*e*, which is made of plastic, e.g., duroplastic material. The flange 37 is provided with a leg portion 38 which is turned inwardly toward the housing 2 for centering the sliding element 19*e*. On the outside, the sliding element 19*e* has a calotte-shaped configuration for movably supporting the complementary calotte-shaped inside surface of the inner ring 13 in the support zone 18. The free end of the sliding element 19*e* is provided about its circumference with radially inwardly directed fins 39 for engagement in the annular groove 28 of the housing 2 so as to radially overlap the housing wall portion 29 and to thereby captivate the sliding element 19*e*.

Figure 7:
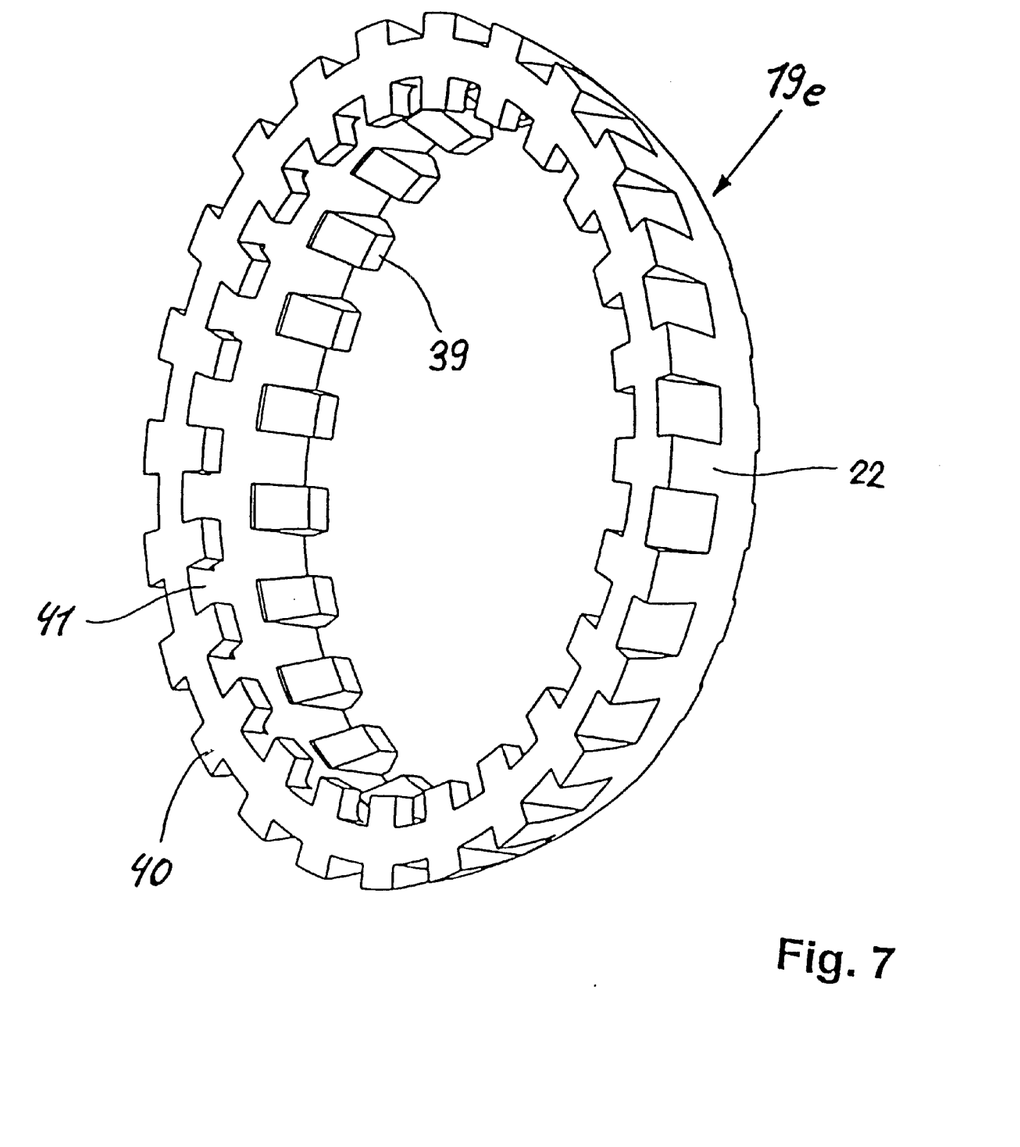
FIG. 7 is a perspective view of the sliding element of FIG. 6.

As shown in FIG. 7, the sliding element 19*e* is configured with a peripheral ribbed construction for realizing substantially corresponding wall thicknesses of the sliding element 19*e*. The splined support surface 40 allows the provision of a simple and effective anti-rotation feature to prevent a relative turning between the flange 37 and the sliding element 19*e*. For example, the anti-rotation may be implemented by forming radial ribs which positively engage recesses 41 of the support surface 40 of the flange 37.

Figure 8:
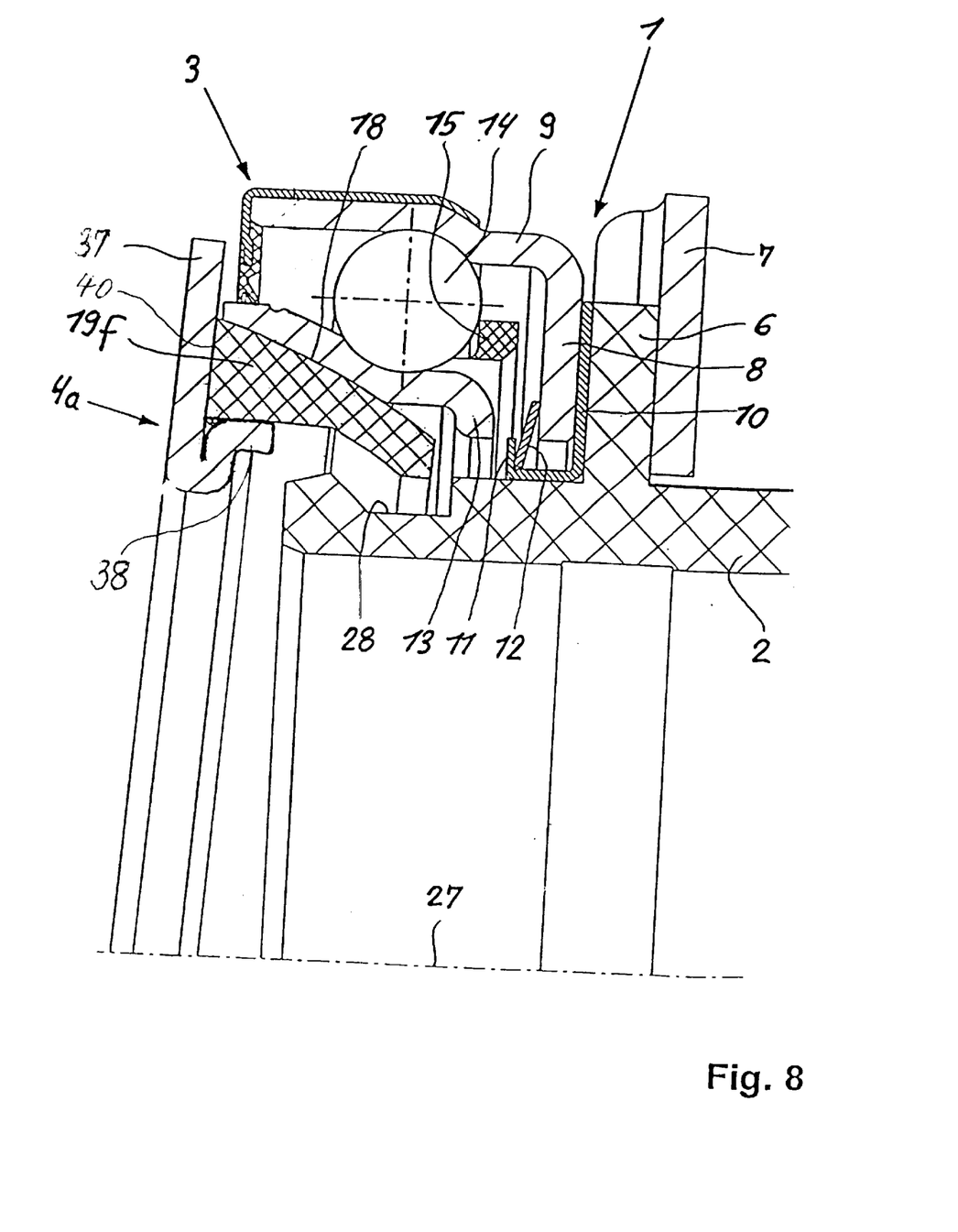
FIG. 8 is a half-section of the release apparatus, showing yet another modified combination of the adjustment ring and the sliding element.

FIG. 8 is a half-section of the release apparatus 1, in which the flange 37 of the adjustment ring 4*a* is bent inwardly by 180° to double the wall thickness and terminates in the leg portion 38 for support of the sliding element 19*f*. In the exemplified embodiment of FIG. 8, the flange 37 affords a larger contact surface for the sliding element 19*f* to ensure a secure attachment thereof. FIG. 8 shows also the adjustment ring 4*a* in a tilted disposition relative to the release bearing 3. Also in this configuration, the configuration of the sliding element 19*f* ensures a large-area support thereof upon the inner ring 13.

Figure 9:
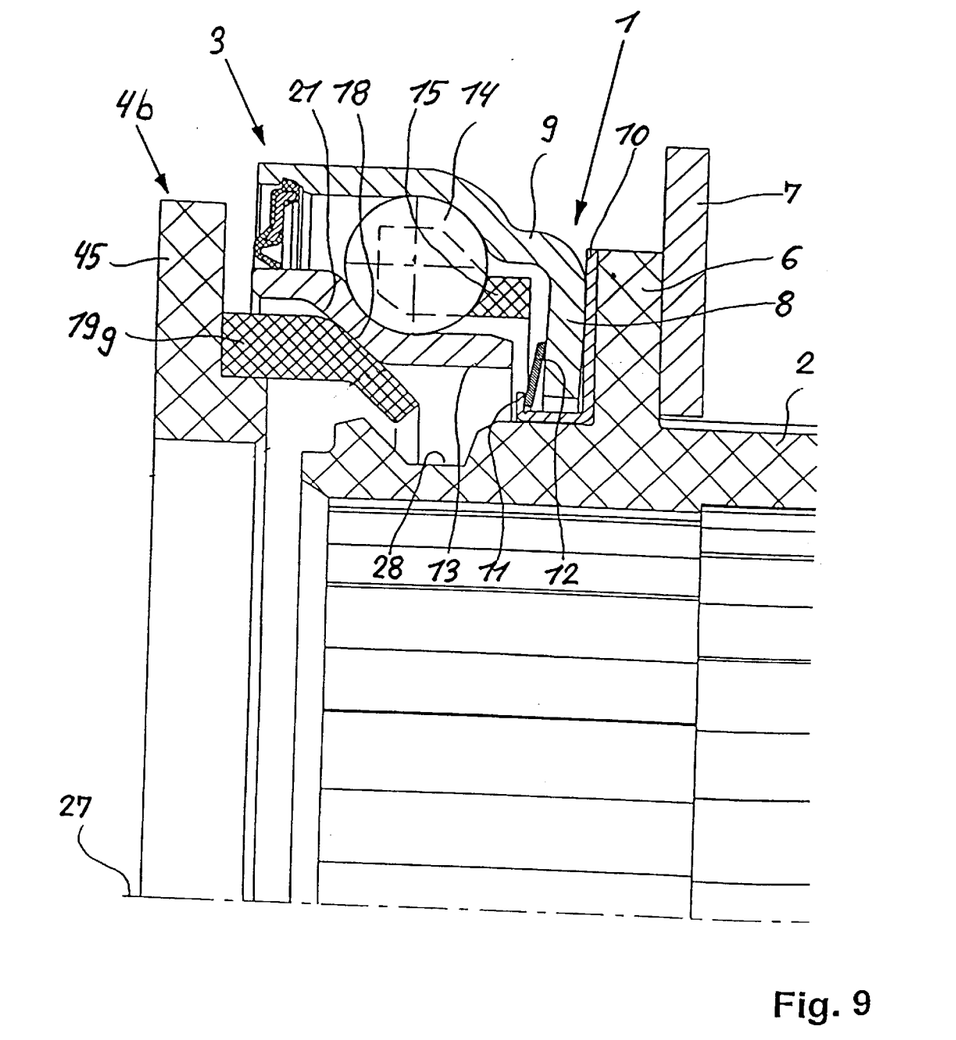
FIG. 9 is a half-section of the release apparatus, showing yet another modified combination of the adjustment ring and the sliding element.

FIG. 9 is a half-section of the release apparatus 1, in which the adjustment ring 4*b* is composed of flange 45 and sliding element 19*g*, both made of a same material, e.g. duroplastic material or ceramics. The flange 45 and the sliding element 19*g* are suitably connected together in permanent way through gluing. A positive connection between the flange 45 and the sliding element 19*g* may be realized by a crown gearing and/or spline profile. Of course, the adjustment ring 4*b* may also be configured of single-piece design, whereby zones that are subject to increased wear may contain carbon fibers.

While the invention has been illustrated and described as embodied in a self-adjusting clutch release bearing, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A release bearing, comprising:
    a rolling-contact bearing having a non-rotatable outer ring, a rotating inner ring, and plural rolling members located between the outer and inner rings; an adjustment ring having a ring flange for abutment against a disk spring of a clutch mechanism; and
    a sliding element made of bearing material and disposed in a support zone, which is defined between the inner ring and the adjustment ring and configured by complementary calotte-shaped portions so that the adjustment ring and the inner ring are movable relative to one another for effecting a self-adjustment of the release bearing, wherein the sliding element is connected to the adjustment ring.

2. The release bearing of claim 1, wherein the sliding element and a leg portion of the adjustment ring have a radius of ≧25 mm in an area of the support zone.

3. The release bearing of claim 1, and further comprising a housing, and a clip mounted in fixed rotative engagement with the housing, wherein the outer ring has an annular skirt which is guided by the clip for displacement in an axial direction.

4. The release bearing of claim 1, wherein the sliding element has segmental recesses in the support zone upon a leg portion of the adjustment ring.

5. The release bearing of claim 1, wherein the sliding element has at least one slot.

6. The release bearing of claim 1, wherein the sliding element is made through an injection molding process.

7. The release bearing of claim 1, wherein the sliding element is positively connected to a leg portion of the adjustment ring.

8. The release bearing of claim 1, wherein the sliding element is urged into forced engagement to a leg portion of the adjustment ring.

9. The release bearing of claim 1, wherein the sliding element is a coating injection-molded onto a leg portion of the adjustment ring.

10. The release bearing of claim 1, wherein the sliding element, on the one hand, and the adjustment ring, on the other hand, are made of different material.

11. The release bearing of claim 1, wherein the adjustment ring is made as drawn part of steel sheet.

12. The release bearing of claim 1, wherein the adjustment ring is made of steel and wherein the sliding element is made of a high-strength and wear-resistant plastic and combined with the adjustment ring of steel to a unitary structure.

13. The release bearing of claim 12, wherein the sliding element is made of thermoplastic material or duroplastic material.

14. The release bearing of claim 12, wherein the sliding element is made of duroplastic material and includes at least one additive selected from the group consisting of carbon fibers, $MoS_2$, PTFE and epoxy resins, for realizing a lubrication and/or improved service life in combination with a duroplastic material.

15. The release bearing of claim 1, wherein the sliding element is made of PPA combined with carbon fibers as wear-reducing agent and PTFE as friction-reducing agent.

16. The release bearing of claim 10, wherein the sliding element is made of ceramic material.

17. The release bearing of claim 1, wherein the sliding element includes a radial shoulder resting against a ring flange of the adjustment ring for limiting a movement range between the inner ring and the adjustment ring.

18. The release bearing of claim 1, wherein the adjustment ring includes a flange for interaction with the disk spring of the clutch mechanism and configured for direct attachment of the sliding element.

19. The release bearing of claim 1, and further comprising a housing formed with an annular groove defined by a housing wall, wherein the adjustment ring has a leg portion whose end portion engages the annular groove of the housing with play so as to overlap an outer contour of the housing wall to thereby captivate the housing, the release bearing and the adjustment ring to form a unitary structure.

20. The release bearing of claim 1, and further comprising a housing formed with an annular groove defined by a housing wall, and a seal received in the housing, wherein the sliding element has a radially inwardly directed projection for defining a labyrinth with at least one of a portion of the housing wall and the seal.

21. The release bearing of claim 1, wherein the calotte-shaped portions of the inner ring and the sliding element are disposed at an angle of $\geqq 20°$ to an axis of symmetry of the release bearing.

* * * * *